US005992494A

United States Patent [19]

Focke et al.

[11] Patent Number: 5,992,494

[45] Date of Patent: Nov. 30, 1999

[54] DEVICE FOR MANUFACTURING PACKETS WITH GLUED FOLDING FLAPS

[75] Inventors: Heinz Focke, Verden; Thomas Häfker, Langwedel, both of Germany

[73] Assignee: Focke & Co. (GmbH & Co.), Verden, Germany

[21] Appl. No.: 08/972,676

[22] Filed: Nov. 18, 1997

[30] Foreign Application Priority Data

Nov. 22, 1996 [DE] Germany .......................... 196 48 445

[51] Int. Cl.[6] ............................ B32B 31/00; B65B 51/02

[52] U.S. Cl. ........................... 156/578; 156/443; 118/32; 118/319; 118/501

[58] Field of Search .................................... 156/443, 378, 156/578; 118/32, 314, 319, 323, 324, 501

[56] References Cited

U.S. PATENT DOCUMENTS 3,277,862 10/1966 Rodman .
4,084,393 4/1978 Focke .
4,704,308 11/1987 Maneke et al. .
5,188,695 2/1993 Colton .
5,558,743 9/1996 Focke et al. ........................ 156/578 X
5,656,084 8/1997 Focke et al. ........................ 118/324 X
5,732,533 3/1998 Focke et al. .
5,855,730 1/1999 Brusehaber et al. .................... 156/443
5,863,380 1/1999 Gambetti ................................ 156/443

FOREIGN PATENT DOCUMENTS 647562 4/1995 European Pat. Off. .
3509730 5/1987 Germany .
3634137 4/1988 Germany .
4241176 6/1994 Germany .
4334745 4/1995 Germany .

*Primary Examiner*—Curtis Mayes
*Attorney, Agent, or Firm*—Sughrue, Mion, Zinn, Macpeak & Seas, PLLC

[57] ABSTRACT

In the manufacture of packets on which folding flaps or other packaging parts are connected to one another by glue, the latter is applied to the blank (10) of the packet by glue nozzles 16. When there is a temporary breakdown, the gluing unit (15) is moved into a waiting position remote from the rotary folding unit (11) and held here in an operating position in a phased manner by the release of glue portions.

7 Claims, 3 Drawing Sheets

DEVICE FOR MANUFACTURING PACKETS WITH GLUED FOLDING FLAPS

BACKGROUND OF THE INVENTION

The invention relates to a device for manufacturing (cuboid-shaped) packets from at least one blank made of foldable packaging material, such as paper, (thin) cardboard or the like, having a gluing unit with at least one glue nozzle for applying glue to packet parts, especially to folding flaps.

In the manufacture of packets from packet parts, especially folding flaps, connected to one another by gluing, gluing units are increasingly being used which transfer, in a non-contact manner, portions of glue, in particular glue spots, to the packaging blanks. Glue nozzles of this type need special handling during a temporary standstill of the packaging machine. In practice, breakdowns occur on all packaging machines, including those for the manufacture of cigarette packets. With the glue nozzles there is the danger that they are no longer operational when the packaging machine starts up again, because of hardening of the glue, in particular because of clogging of the nozzles.

SUMMARY OF THE INVENTION

The object underlying the invention is to ensure, on packaging machines with gluing units having glue nozzles, that, during a temporary breakdown of the packaging machine, the gluing unit or the glue nozzles nevertheless remain in working order.

In achieving this purpose, the device according to the invention is characterised in that, if there is a breakdown in the packaging process, the gluing unit may be moved out of a working or gluing position adjacent to the packets or blanks for same, into a waiting position, and in that the gluing unit or its glue nozzles may be activated from time to time in the waiting position, glue portions released by the glue nozzle or the glue nozzles being collected.

The inventive idea, therefore, consists in maintaining the functioning of the glue nozzles even during a breakdown of the packaging machine, although with a reduced number of cycles. To this end, the glue nozzles are moved out of a working or gluing position in the direct vicinity of the packets and activated from time to time in a remote waiting position through the release of glue portions. In this way, hardening of the glue in the region of the nozzles is avoided.

The gluing unit, with preferably a plurality of glue nozzles disposed beside one another, is arranged on a special regulating mechanism, preferably in the form of a four-bar mechanism. This makes possible a special characteristic line of movement for the gluing unit, namely out of a slanting working or gluing position of the glue nozzles into an upright position of same, displaced laterally. In this waiting position, lying remote from the rotary folding unit, the gluing unit is held in an operative state through intermittent, especially phased activation of the glue nozzles. The glue portions released are collected, for example, by a trough. When the packaging machine starts up again, the gluing unit is moved back into the working or gluing position.

A further special feature of the invention consists in the fact that the gluing unit can be (additionally) moved into a waiting position. This position of the gluing unit is chosen to be such that access to the individual glue nozzles is made easier for carrying out cleaning, maintenance and possible testing work. To this end, the gluing unit is by preference displaced by a linear guide in a direction parallel to the axis of the rotary folding unit.

Further details of the invention relate to the bedding and the actuation of the gluing unit as well as to the arrangement of a collecting trough. An embodiment of the invention, given by way of example, is explained in greater detail below with the aid of the figures. These show:

DESCRIPTION OF A PREFERRED EMBODIMENT

Figure 1:
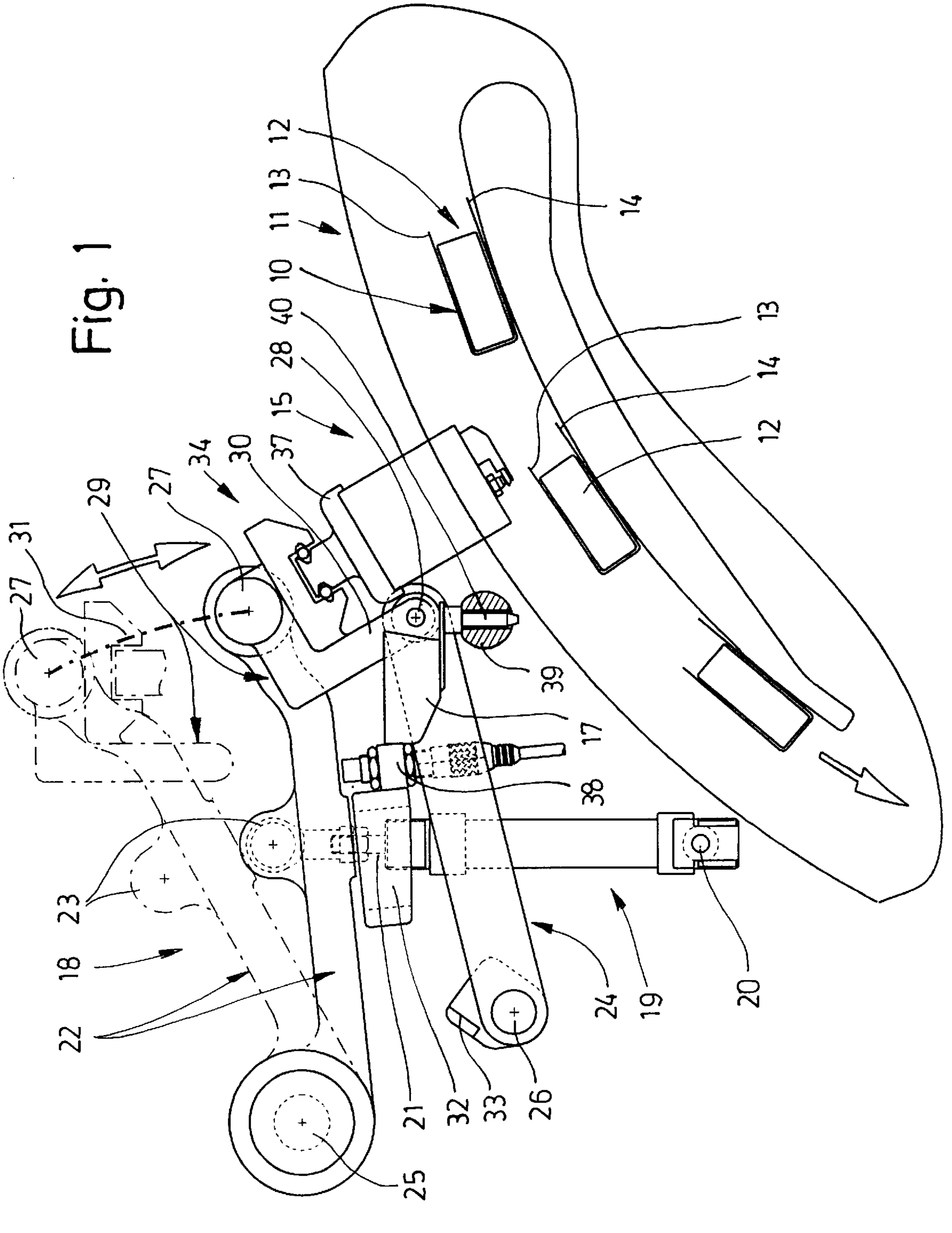
FIG. 1 a gluing unit with an actuating device, in side view and in the working or gluing position, FIG. 2 the gluing unit according to FIG. 1 in a withdrawn position, namely in the waiting position, FIG. 3 a view of the gluing unit displaced by 90° in relation to FIG. 1 and FIG. 2, partly with cross sections.

A preferred example of application is shown in the drawings, namely the manufacture of cigarette packets of the soft-case type. On this type of packaging, blanks 10 made of paper or similar packaging material are folded into a pouch-shaped wrapping as a portion of the packet. A rotary folding unit 11, only a detail of which is shown diagrammatically in the drawings, serves this operation. The rotary folding unit can be configured, for example, as per DE 35 45 884.

A plurality of folding mandrels 12, which are rectangular in cross-section , are distributed over the outer perimeter of the rotary folding unit. These mandrels respectively take hold of one blank 10. On the folding mandrel 12, the blank is folded into a pouch. In a first folding step (FIG. 1, FIG. 2), the blank 10 is laid in a U-shape around the transverse folding mandrel 12, such that an inner flap 12 and an outer flap 14 are formed on the reverse side in the conveying direction. To connect said flaps, glue is applied to the side of the inner flap 13 turned towards the outside in a radial direction. When the inner flap 13, provided with glue, has been folded over, the outer flap 14 is folded on the outside against the inner flap 13 and connected to same by the glue.

A gluing unit 15 serves to apply the glue to the inner flap 13. This unit is positioned stationary on the outer perimeter of the rotary folding unit 11, outside the movement path of the folding mandrels 12 yet directly adjacent to same. During the preferably continuous rotation of the rotary folding unit 11, glue is applied to the side of the inner flap 13 which is turned towards the outside.

On the present embodiment, glue spots, i.e. areas of glue in the shape of spots, are applied to the inner flap 13. By preference, these are a row, running in the longitudinal direction of the inner flap 13, of a plurality of glue spots lying beside one another. On the present embodiment, given by way of example, seven glue spots are transferred to the folding flap.

Figure 3:
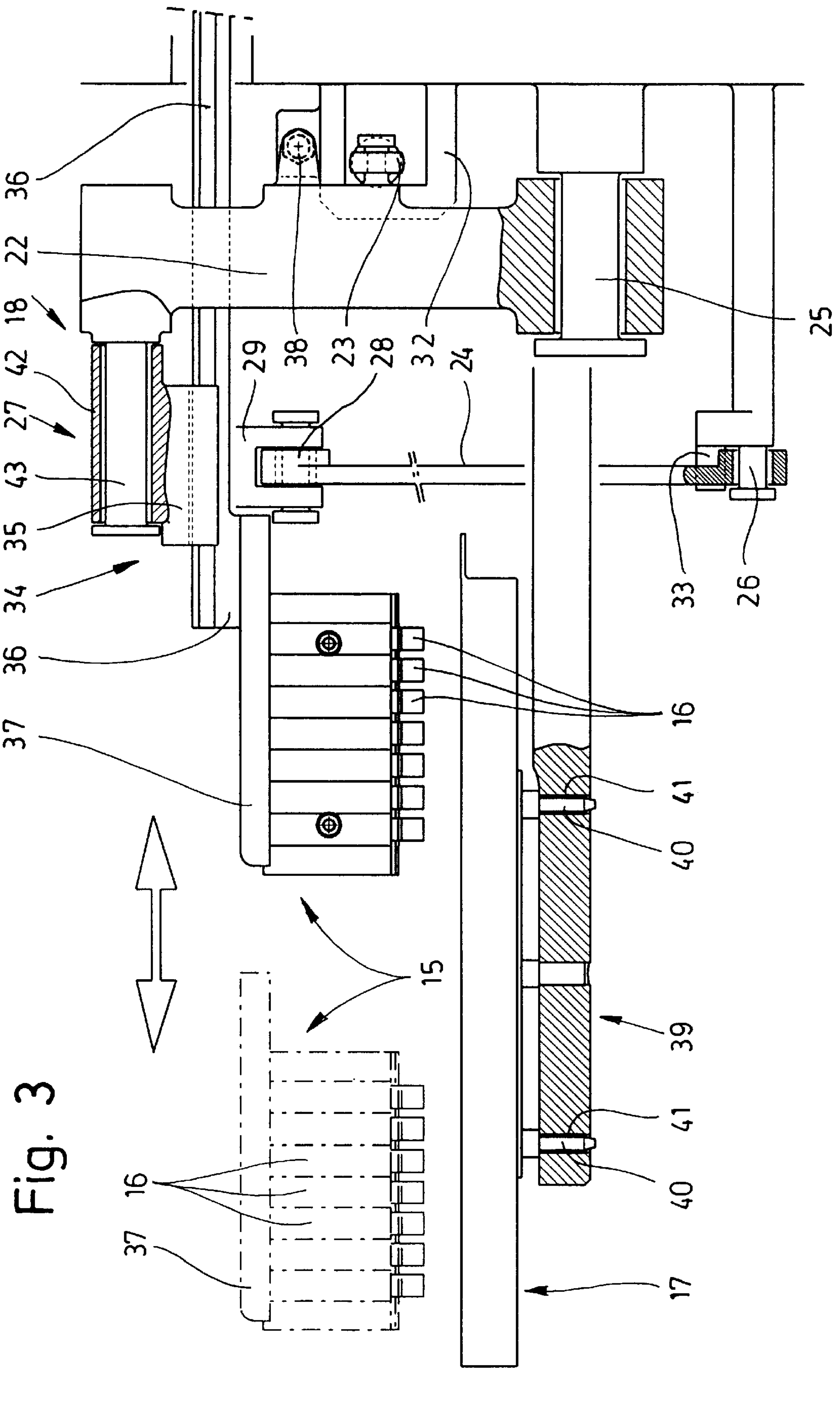

For this purpose, the gluing unit 15 consists of a plurality of glue nozzles 16 disposed the one beside the other. Each of the glue nozzles 16 lying beside one another in the axial direction of the rotary folding unit 11 or in the longitudinal direction of the inner flap 13 transfers one glue spot to the inner flap 13. On the mentioned example of the gluing pattern, seven glue nozzles 16 are accordingly positioned beside one another as a unit (FIG. 3).

The glue nozzles are disposed in a working or gluing position as per FIG. 1 adjacent to the movement path of the blanks. On the basis of packaging technology guidelines, the gluing unit (15) is positioned off-set to an (imagined) vertical central plane of the rotary folding unit 11. So that the glue is transferred by the glue nozzles 16 in a direction perpendicular to the plane of the inner flap 13, the glue nozzles 16 are positioned in a slanting plane or with axes aligned obliquely (FIG. 1)

Figure 2:
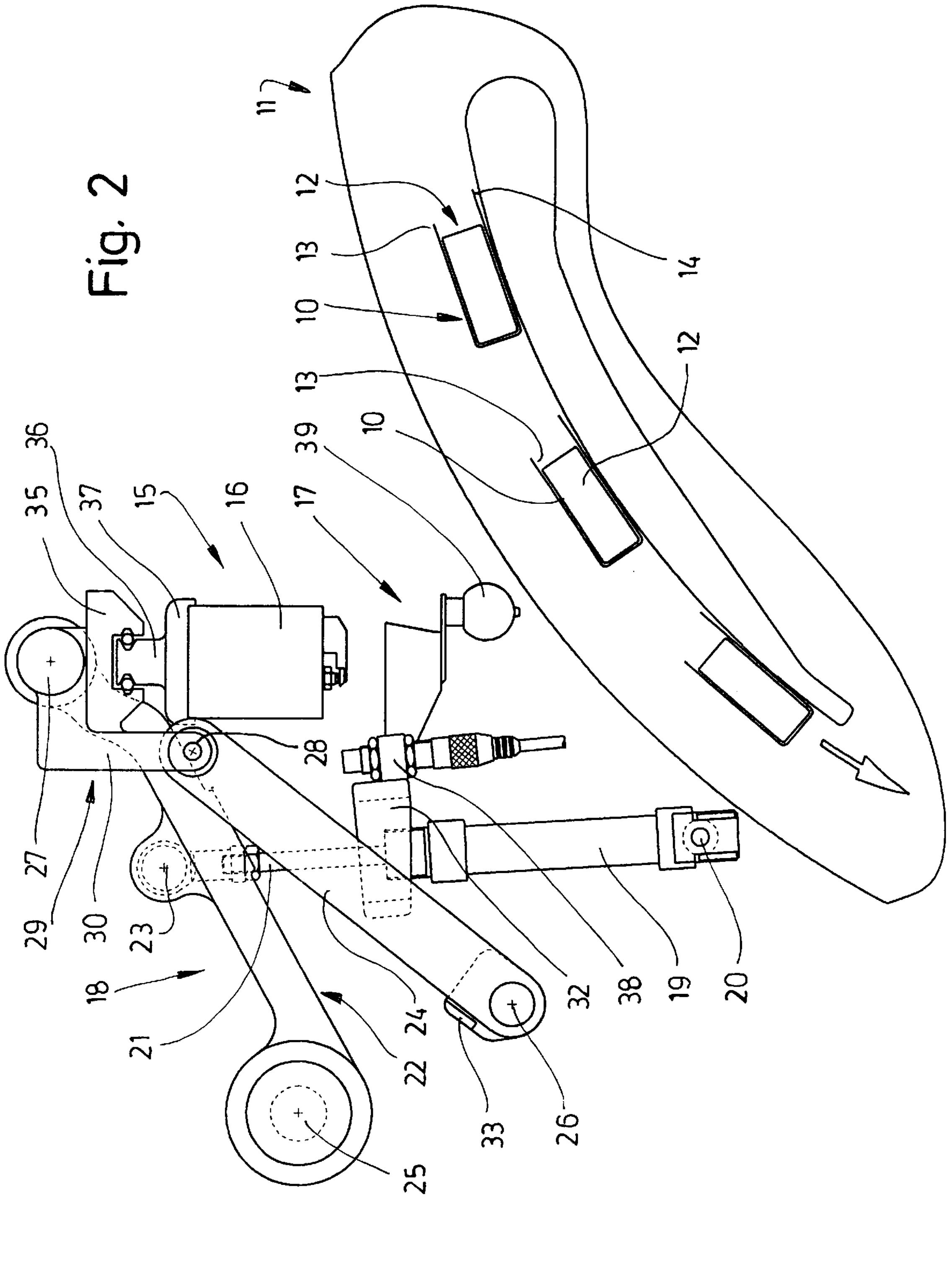

When the packaging machine breaks down, i.e. during a temporary standstill of the rotary folding unit 11 or where blanks 10 are missing on the folding mandrels 12, the gluing unit 15 is moved out of its working or gluing position according to FIG. 1 into a waiting position remote from the rotary folding unit 11 as per FIG. 2. In this waiting position, the readiness or ability of the gluing unit 15 to operate is maintained. To this end, the gluing unit 15 is activated intermittently through the release of glue portions by the glue nozzles 16. The latter work, therefore, as in the gluing process, it being possible to reduce the number of working cycles of the gluing unit 15 in relation to its proper operating sequence. In any case, through this dummy operation of the gluing unit 15, the operability of same, namely of the glue nozzles, is maintained until the packaging machine starts up again.

The glue portions released by the gluing unit 15 are collected, this being done by a collecting trough 17. The latter is positioned stationary, namely in the waiting position of the gluing unit 15 as per FIG. 2, below the glue nozzles 16.

In the waiting position of the gluing unit 15, the glue nozzles 16 are disposed in an upright position (FIG. 2) to make it easier to maintain operation. In addition to this, the glue nozzles 16 are offset somewhat to the side in relation to the working or gluing position.

A special actuating device serves to carry out the corresponding movement between the two end positions of the gluing unit 15. On the present example, this device consists of a four-bar mechanism 18. The latter is adjusted, in the sense of pivoting, by an actuating member, by a pressure means cylinder 19 in fact. This cylinder is mounted swivellable with a lower end stationary in the region of a joint 20. A piston rod 21 is hinged to the four-bar mechanism 18, through a main lever 22. A pivoting bearing 23 for the (upper) end of the piston rod 21 is formed on the main lever.

The four-bar mechanism 18 includes a second lever, namely a pivoted lever 24 which is off-set and, in its initial position as per FIG. 1, runs approximately parallel. Main lever 22 and pivoted lever 24 are mounted fixed but swivellable respectively with free ends adjacent to one another, namely the main lever 22 with a main bearing 25 and the pivoted lever 24 with a pivotal bearing 26. The ends of the main lever 22 and of the pivoted lever 24 lying opposite the main bearing 25, on the one hand, and the pivotal bearing 26, on the other hand, are hinged to the gluing unit 25 respectively at a spacing from one another, the main lever 22 being connected to a rocker bearing 27 and the pivoted lever 24 to a rocker bearing 28.

A rigid bracket 29 is provided to join the ends of the main lever 22 and of the pivoted lever 24 with the gluing unit 15. The rocker bearing 28 for the pivoted lever 24 is disposed on an upright arm 30 of said bracket.

Through an anti-clockwise swivelling movement of the four-bar mechanism 18, i.e. from FIG. 1 into FIG. 2, the rocker bearing 27 of the main lever 22 is moved along a partial circuit 31. The gluing unit 15 follows this movement, the gluing unit 15 being swivelled at the same time as a result of the shorter pivoted lever 24 and a corresponding circuit of the rocker bearing 28, clockwise into an upright position as per FIG. 2. Main lever 22 and pivoted lever 24 are here aligned at an acute angle to one another on the basis of kinematics. The pivoting movement described is effected by driving out the piston rod 21.

The end positions of the four-bar mechanism 18 and thus of the gluing unit 15 are determined by end stops. In the working or gluing position, the main lever lies on a fixed end stop 32 which is, for example, connected to a portion of the machine frame. In the upper end or waiting position as per FIG. 2, the pivoted lever 24 lies against an end stop 33 formed in the region of the pivotal bearing 26.

Further adjustability, independent of the four-bar mechanism 18, is provided for the gluing unit 15, namely to move the gluing unit 15 into a service position which is indicated by a dot-dash line in FIG. 3. In this position, the gluing unit 15 is easy to reach in order to carry out maintenance, cleaning and repair work. The gluing unit 15 is here moved in a direction parallel to the axis of the rotary folding unit 11, away from same.

To carry out this (additional) movement, the gluing unit 15 is connected to a linear drive mechanism 34. This consists of a slide 35 and a long running rail 36. Slide 35 and running rail 36 may be moved relative to one another.

On the present embodiment, given by way of example, the glue nozzles 16, positioned beside one another as a block, are connected with a long carrier 37. The latter is in turn connected to a facing end of the running rail 36. The slide 35 is fixedly mounted here, connected to the main lever 22 or to its rocker bearing 27. On the present example, the slide 35 is attached to a sleeve 42 in the region of the rocker bearing 27. A journal 43 turning in this sleeve 42 is securely connected to the main lever 22.

To move the gluing unit 15 from the waiting position into the service position, the running rail 36 is accordingly driven in the slide 35 until the position shown on the left-hand side in FIG. 3 is reached. The gluing unit 15 can be actuated here by a control unit, not shown. The (fixed) slide 35 encompasses the running rail with a U-shaped profile.

The device described is provided with a monitoring unit which prevents the packaging machine or the rotary folding unit 11 from (re-)starting if the gluing unit 15 is not in the working or gluing position as per FIG. 1. To this end, a contactless switching device is provided, namely a so-called initiator 38. The latter co-operates with the four-bar mechanism 18, in the present case with the main lever 22. Said lever is located in the lower position, facing the rotary folding unit 11, in the immediate vicinity of the initiator 38 (FIG. 1). In this way, a signal is generated which releases the packaging machine or the rotary folding unit 11 to become operational. The initiator 38 is in the present case connected with the end stop 32.

A special feature is provided in respect of the arrangement of the collecting trough 17. In the waiting position, the gluing unit 15 is located with all its glue nozzles 16 exactly above the collecting trough 17. All the glue nozzles 16 are activated in predetermined cycles, in such a way that the operability of the glue nozzles 16 is maintained. The glue portions released in this process fall into the long collecting trough 17.

The latter is in the present case so configured in respect of its length that the glue nozzles 16 are positioned above the collecting trough 17 in the region of the service position as well (on the left in FIG. 3). In this position, too, released glue portions are accordingly collected.

The collecting trough 17 is disposed on a rod-shaped carrying arm 39 connected to the machine frame. On the underside of the collecting trough 17 or on the base of same, there are arranged pins 40 which enter bore holes 41 of the carrying arm 39 which run diametrically. Thus the collecting trough 17 can be removed in a simple manner from the carrying device for emptying.

An alternative to the described embodiment of the gluing device consists in leaving the gluing unit 15, during a temporary standstill of the rotary folding unit 11 or where blanks 10 are missing, in the working or gluing position shown in FIG. 1 and moving a suitable collecting receptacle temporarily into a position below the glue nozzles 16. With this solution, too, the glue nozzles 16 are activated from time to time through the release of glue portions.

What is claimed is:

1. A device for manufacturing packs from at least one blank (10) made of foldable packaging material, said device comprising a folding turret, rotatable about a rotation axis, for transporting the packs or packaging material; and a gluing unit having at least one glue nozzle (16) for applying glue to folding flaps (13) of the packs, said device further comprising:

a) first means for moving, when the manufacturing process is interrupted, the gluing unit (15) out of a working position, adjacent to the periphery of the rotary folding unit (11), into a waiting position, b) said first moving means comprising a regulating mechanism, connected to the gluing unit (15), for moving the gluing unit between said working position and said waiting position, c) the waiting position of the gluing unit (15) being laterally displaced relative to the working position, d) the gluing unit (15), in the waiting position, being positioned above a collecting trough (17) which collects glue portions released by the gluing unit (15); and e) means for intermittently activating the glue nozzle (16), in the waiting position, to release the glue portions which are collected by the collecting trough (17).

2. The device according to claim 1, wherein the gluing unit (15) has a plurality of glue nozzles (16) which are aligned in the, working position radially to the rotary folding unit (11) with an oblique axis of the glue nozzles (16), and wherein the gluing unit (15) is held in the waiting position with the glue nozzles (16) positioned upright.

3. The device according to claim 2, wherein said regulating mechanism is a four-bar mechanism (18), and comprises:

a main first lever (22) having a first end which is pivotably mounted by a stationary main bearing (25);

a pivoted second lever (24) having a first end which is pivotably mounted by a stationary pivotal bearing (26), respective opposite ends of the main first lever (22) and the pivoted second lever (24) being hinged to the gluing unit (15), said main first lever (22) and said pivoted second lever (24) being of differing lengths; and means for actuating the four-bar mechanism (18) to move said gluing unit (1 5) out of the working position adjacent the rotary folding unit (11) into the upright waiting position offset to the folding unit (11).

4. The device according to claim 1, further comprising second means for additionally moving the gluing unit, in a direction parallel to said rotation axis, into a service position at a distance from the rotary folding unit (11).

5. The device according to claim 4, wherein said second moving means comprises a linear drive mechanism (34) for moving the gluing unit (15) into the service position, and wherein a running rail (36) is connected to the gluing unit (15) and is displaceable in a fixed slide (35) to move the gluing unit (15) into the service position.

6. The device according to claim 5, wherein the slide (35) is connected to said second main lever (22).

7. The device according to claim 1, wherein the collecting trough (17) is detachedly fixed to a carrying arm (39) of the device.

* * * * *